United States Patent
Wang et al.

(10) Patent No.: US 6,869,909 B2
(45) Date of Patent: Mar. 22, 2005

(54) YELLOW IMAGES WITH IMPROVED LIGHT STABILITY AND YELLOW DYES USEFUL THEREIN

(75) Inventors: Ruizheng Wang, Rochester, NY (US); Linda A. Kaszczuk, Webster, NY (US); Ann L. Carroll-Lee, Rochester, NY (US); Derek D. Chapman, Rochester, NY (US); Charles H. Weidner, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 336 days.

(21) Appl. No.: 10/153,536

(22) Filed: May 22, 2002

(65) Prior Publication Data

US 2003/0226220 A1 Dec. 11, 2003

(51) Int. Cl.[7] .......................... B41M 5/035; B41M 5/38
(52) U.S. Cl. .................. 503/227; 106/31.43; 106/31.45
(58) Field of Search ............................. 8/471; 503/227; 106/31.43, 31.45

(56) References Cited

U.S. PATENT DOCUMENTS

| | | | |
|---|---|---|---|
| 4,701,439 A | 10/1987 | Weaver et al. | 503/227 |
| 4,833,123 A | 5/1989 | Hashimoto et al. | 503/227 |
| 5,081,101 A | 1/1992 | Evans et al. | 503/227 |

OTHER PUBLICATIONS

L. A. Kaszczuk, et al, "Thermal Yellow Donor and Dyes", USSN 10/ , (D–83869) filed May 22, 2002.

*Primary Examiner*—B. Hamilton Hess
(74) *Attorney, Agent, or Firm*—Kathleen Neuner Manne

(57) ABSTRACT

Disclosed is a dye combination and a thermal dye transfer yellow donor element containing the combination of dyes useful for forming a light stable yellow image comprising a yellow dye having the formula:

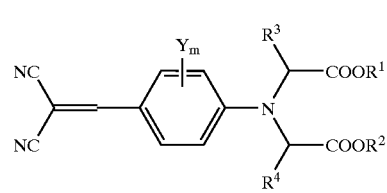

I wherein:
$R^1$ and $R^2$ each independently represents an alkyl group of from 1 to 10 carbons atoms or a cycloalkyl group of from 5 to 7 carbon atoms;
$R^3$ and $R^4$ each independently represents hydrogen, or an unsubstituted lower alkyl group of 1 to 4 carbon atoms;
each Y independently represents halogen, or a lower alkyl or alkoxy group of 1 to 4 carbon atoms; and
m is 0 to 4.

Such a dye combination and element provide improved color and stability, especially for proofing.

27 Claims, No Drawings

YELLOW IMAGES WITH IMPROVED LIGHT STABILITY AND YELLOW DYES USEFUL THEREIN

CROSS-REFERENCE TO RELATED APPLICATIONS

This application is one of three applications cofiled, the other applications being U.S. Ser. Nos. 10/152,859 and 10/153,569.

FIELD OF THE INVENTION

This invention relates to the use of a yellow dye in generating a color image which has good dye light stability and colorimetry and to a thermal dye transfer element useful therewith.

BACKGROUND OF THE INVENTION

In order to approximate the appearance of continuous tone (photographic) images via ink-on-paper printing, the commercial printing industry relies on the process known as halftone printing. In halftone printing, color density gradations are produced by printing patterns of dots or areas of varying sizes, but of the same color density, instead of varying the color density continuously as is done in photographic printing.

There is an important commercial need to obtain a color proof image before a printing press run is made. It is desired that the color proof will accurately represent at least the details and color tone scale of the prints obtained from the printing press. In many cases, it is also desirable that the color proof accurately represent the image quality and halftone pattern of the prints obtained on the printing press. In the sequence of operations necessary to produce an ink-printed, full color picture, a proof is also required to check the accuracy of the color separation data from which the final three or more printing plates or cylinders are made. Traditionally, such color separations proofs have involved silver halide light-sensitive systems which require many exposure and processing steps before a final, full color picture is assembled.

Colorants that are used in the printing industry are insoluble pigments. By virtue of their pigment character, the spectrophotometric curves of the printing inks are often unusually sharp on either the bathochromic or hypsochromic side. This can cause problems in color proofing systems in which dyes, as opposed to pigments, are being used. It is very difficult to match the hue of a given ink using a single dye.

One way to thermally obtain a print using the electronic signals described above is to use a laser instead of a thermal-printing head. In such a system, the donor sheet includes a material, which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In U.S. Pat. No. 5,126,760, a process is also described for producing a direct digital, halftone color proof of an original image on a dye-receiving element. The proof can then be used to represent a printed color image obtained from a printing press. The process described therein comprises:

a) generating a set of electrical signals which is representative of the shape and color scale of an original image;

b) contacting a dye-donor element comprising a support having thereon a dye layer and an infrared-absorbing material with a first dye-receiving element comprising a support having thereon a polymeric, dye image-receiving layer;

c) using the signals to image-wise heat by means of a diode laser the dye-donor element, thereby transferring a dye image to the first dye-receiving element; and d) retransferring the dye image to a second dye-image-receiving element which has the same substrate as the printed color image. In the above process, multiple dye-donors are used to obtain a complete range of colors in the proof. For example, for a full color proof, four colors—cyan, magenta, yellow and black are normally used.

By using the above process, the image dye is transferred by heating the dye-donor containing the infrared-absorbing material with the diode laser to volatilize the dye, the diode laser beam being modulated by the set of signals which is representative of the shape and color of the original image, so that the dye is heated to cause volatilization only in those areas in which its presence is required on the dye-receiving layer to reconstruct the original image.

Similarly, a thermal transfer proof can be generated by using a thermal print head in place of a diode laser as described in U.S. Pat. No. 4,923,846. Commonly available thermal heads are not capable of generating halftone images of adequate resolution, but can produce high quality continuous tone proof images, which are satisfactory in many instances. U.S. Pat. No. 4,923,846 also discloses the choice of mixtures of dyes for use in thermal imaging proofing systems. Inkjet is also used as a low cost proofing method as described in U.S. Pat. No. 6,022,440. Likewise, an inkjet proof can be generated using combinations of either dispersed dyes in an aqueous fluid or dissolved dyes in a solvent based system. U.S. Pat. No. 6,352,330 discloses methods for accomplishing this. Ink jet printers can also produce high quality continuous tone proof images, which by virtue of their cost, are satisfactory in many instances. The dyes are selected on the basis of values for hue error and turbidity. The Graphic Arts Technical Foundation Research Report No. 38, "Color Material" (58-(5) 293–301, 1985) gives an account of this method.

An alternative and more precise method for color measurement and analysis uses the concept of uniform color space known as CIELAB, in which a sample is analyzed mathematically in terms of its spectrophotometric curve, the nature of the illuminant under which it is viewed, and the color vision of a standard observer. For a discussion of CIELAB and color measurement, see *Principles of Color Technology*, $2^{nd}$ Edition, F. W. Billmeyer, pp.25–110, Wiley Interscience and *Optical Radiation Measurements*, Volume 2, F. Grum, pp. 33–145, Academic Press.

In using CIELAB, colors can be expressed in terms of three parameters: $L^*$, $a^*$, and $b^*$, where $L^*$ is a lightness function, and $a^*$ and $b^*$ define a point in color space. Thus, a plot of $a^*$ vs $b^*$ values for a color sample can be used to accurately show where that sample lies in color space, i.e., what its hue is. This allows different samples to be compared for hue if they have similar density and $L^*$ values.

In color proofing in the printing industry, it is important to be able to match the proofing ink references provided by the International Prepress Proofing Association. In the United States, these ink references are density patches made with standard 4-color process inks and are known as SWOP® (Specifications Web Offset Publications) color aims. In 1995, ANSI CGATS TR 001-1995 was published which is becoming the standard in the United States printing industry. For additional information on color measurement of inks for web offset proofing, see "Advances in Printing Science and Technology", Proceedings of the 19th International Conference of Printing Research Institutes, Eisenstadt, Austria, June 1987, J. T. Ling and R. Warner, p.55.

It is also equally important for dye(s) to have adequate stability to light in order for the color image or proof to be stable when viewed.

A problem has existed with the use of certain dyes in dye-donor elements for thermal dye transfer printing. Some of the dyes proposed for use have proper spectroscopic properties, however, they do not have adequate light stability. It, therefore, would be desirable to provide dyes which not only have proper spectroscopy properties in order to match the standard ink references, but also have good light stability.

In order to better match the yellow proofing ink reference standardized by ANSI CGATS TR 001-1995, it is desired to use a short yellow dye with λ max at about 410 nm along with three other yellow dyes as the yellow donor element. U.S. Pat. Nos. 5,081,101, 4,701,439 and 4,833,123 relate to cyanovinyl-dialkylaniline dyes similar to those used in the invention. They, however, either lack adequate stability to light or lack proper spectroscopy property for good color match, and have no teaching on how to make them more light stable while maintaining good color. For example, a class of yellow dyes disclosed in U.S. Pat. No. 5,081,101 has the desired hue with λmax at about 410 nm. This class of dyes, however, is lacking in desired light stability. Another class of dyes of cyanovinyl-dialkylanilines disclosed in U.S. Pat. Nos. 5,081,101, 4,701,439 and 4,833,123 do have adequate light stability, but they all have λmax at greater than 420 nm which is too long for yellow color proofing.

It is a problem to be solved to provide a yellow dye for imaging that provides the desired hue less than 420 nm with satisfactory stability.

SUMMARY OF THE INVENTION

The invention provides a dye combination and a thermal dye transfer yellow donor element containing the combination of dyes useful for forming a light stable yellow image comprising a yellow dye having the formula:

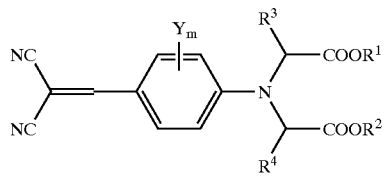

I wherein:
- $R^1$ and $R^2$ each independently represents an alkyl group of from 1 to 10 carbons atoms or a cycloalkyl group of from 5 to 7 carbon atoms;
- $R^3$ and $R^4$ each independently represents hydrogen, or an unsubstituted lower alkyl group of 1 to 4 carbon atoms;
- each Y independently represents halogen, or a lower alkyl or alkoxy group of 1 to 4 carbon atoms, and
- m is 0 to 4.

Such a dye combination and element provides improved stability with desirable hue, especially for proofing.

DETAILED DESCRIPTION OF THE INVENTION

The invention is generally as described above. Compounds included within the scope of the invention include, but are not limited to, the following:

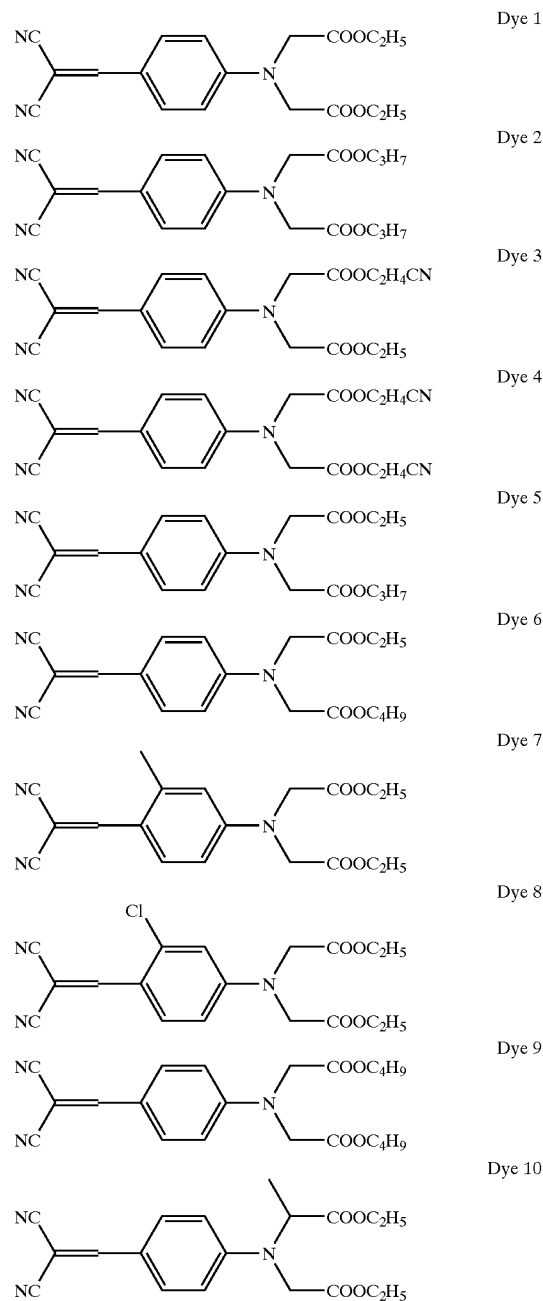

-continued

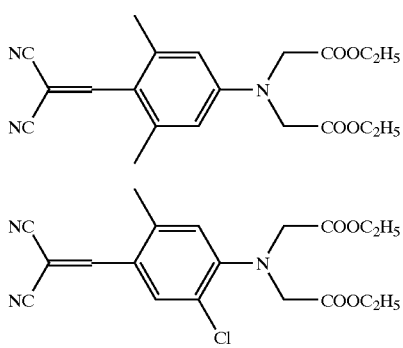

Dye 11

Dye 12

It will be shown by comparative tests hereinafter that the compounds described above in this invention show an improved combination of light stability while having the desired λmax below 420 and typically at about 410 nm, and thereby provide good colorimetry when used in a mixture with other yellow dyes described below. Suitably, a second yellow dye is employed having the formula:

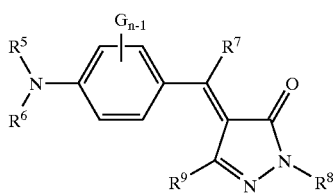

II wherein:
- $R^8$ represents an alkyl group of from 1 to 10 carbon atoms, a cycloalkyl group of from 5 to 7 carbon atoms, an allyl group; all such as those listed for $R^1$, or an aryl group having from 6 to 10 carbon atoms, such as phenyl, naphthyl, p-tolyl, m-chlorophenyl, p-methoxyphenyl, m-bromophenyl, or o-tolyl;
- $R^9$ represents an alkoxy group having from 1 to 10 carbon atoms, such as methoxy, ethoxy, methoxyethoxy or 2-cyanoethoxy; an aryloxy group having from 6 to 10 carbon atoms, such as phenoxy, m-chlorophenoxy, or naphthoxy; $NHR^{10}$; $NR^{10}R^{11}$ or the atoms necessary to complete a 6-membered ring fused to the benzene ring;
- $R^5$ and $R^6$ each represents any of the groups for $R^8$; provided $R^5$ and $R^6$ can be joined together to form, along with the nitrogen to which they are attached, a 5- or 6-membered heterocyclic ring, such as a pyrrolidine or morpholine ring, or either or both of $R^5$ and $R^6$ can be joined to the carbon atom of the benzene ring at a position ortho to the position of attachment of the anilino nitrogen to form a 5- or 6-membered ring apolycyclic system such as 1,2,3,4-tetrahydroquinoline, julolidine, 2,3-dihydroindole, or benzomorpholine;
- $R^7$ represents hydrogen; an alkyl group of from 1 to 10 carbon atoms, a cycloalkyl group of from about 5 to 7 carbon atoms, an allyl group, halogen, carbamoyl such as N,N-dimethylcarbamoyl, or alkoxycarbonyl group such as ethoxycarbonyl or methoxyethoxycarbonyl;
- $R^{10}$ and $R^{11}$ each independently represents any of the groups for $R^8$, or $R^{10}$ and $R^{11}$ may be joined together to form, along with the nitrogen to which they are attached, a 5- or 6-membered heterocyclic ring such as a pyrrolidine or morpholine ring;

n is from 1 to 3; and

G represents hydrogen, an alkyl or alkoxy group of from 1 to 10 carbon atoms, halogen, or an aryloxy group, or represents the atoms necessary to complete a 5- or 6-membered ring, thus forming a fused ring system, such as naphthalene, quinoline, isoquinoline or benzothiazole.

The following are examples of useful dyes having formula II:

| Dye | $R_9$ | $R_8$ | $R_5$ | $R_6$ |
|---|---|---|---|---|
| IIa | $OC_2H_5$ | $C_6H_5$ | $C_2H_5$ | $C_2H_5$ |
| IIb | $OC_2H_5$ | $C_6H_5$ | $CH_2C_6H_5$ | $CH_2C_6H_5$ |
| IIc | $OC_2H_5$ | $C_6H_5$ | $CH_2C_6H_5$ | $C_2H_5$ |
| IId | $N(CH_3)_2$ | $C_6H_5$ | $C_2H_5$ | $C_2H_5$ |
| IIe | $N(CH_3)_2$ | $C_6H_5$ | $CH_2C_6H_5$ | $CH_2C_6H_5$ |
| IIf | $N(C_2H_5)_2$ | $C_6H_5$ | $C_2H_5$ | $C_2H_5$ |
| IIg | $CH_3$ | $C_6H_5$ | $C_2H_5$ | $C_2H_5$ |
| IIh | $C(O)CH_3$ | $C_6H_5$ | $C_2H_5$ | $C_2H_5$ |
| IIj | $C(O)OCH_3$ | $C_6H_5$ | $C_2H_5$ | $C_2H_5$ |
| IIk | $N(CH_3)_2$ | $4\text{-}ClC_6H_4$ | $C_2H_5$ | $C_2H_5$ |

In a specific embodiment of the invention, the second yellow dye is employed having the following structure (Dye 13 or IId):

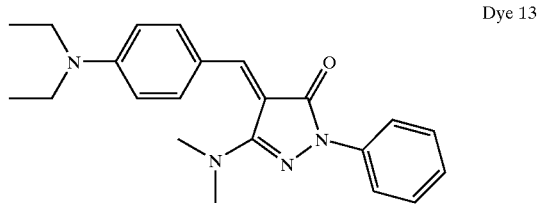

Dye 13

In a further embodiment of the invention, a third yellow dye is employed having formula III:

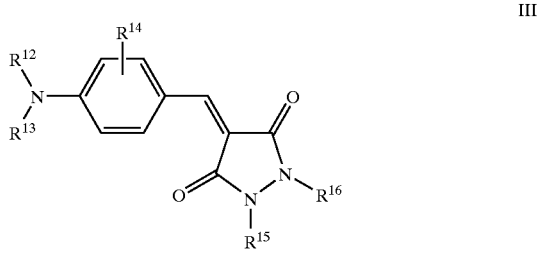

III

- $R^{12}$ is an alkyl or allyl group of from 1 to 6 carbon atoms, such as methyl, ethyl, propyl, isopropyl, butyl, pentyl, allyl, but-2-en-1-yl, 1,1-dichloropropen-3-yl, or such alkyl or allyl groups substituted with hydroxy, acyloxy, alkoxy, aryl, carboxy, carbalkoxy, cyano, acylamido, halogen, or phenyl;
- $R^{13}$ is any of the groups as described for $R^{12}$, or represents the atoms which when taken together with $R^{14}$ forms a 5- or 6-membered ring;
- $R^{14}$ is an alkyl group or an alkoxy group of from 1 to 6 carbon atoms, or represents the atoms which when taken together with $R^{13}$ forms a 5- or 6-membered ring; and
- $R^{15}$ and $R^{16}$ are each independently an alkyl group of from 1 to 6 carbon atoms or an aryl group of from 6 to 10 carbon atoms, such as phenyl, naphthyl, p-tolyl, m-chlorophenyl, p-methoxyphenyl, m-bromophenyl, and o-tolyl.

The following are useful dyes of formula III:

| Dye | $R_{12}$ | $R_{13}$ | $R_{14}$ | $R_{15}$ | $R_{16}$ |
|---|---|---|---|---|---|
| IIIa | $C_2H_5$ | $C_2H_5$ | H | $C_6H_5$ | $C_2H_5$ |
| IIIb | $C_2H_5$ | —$C(CH_3)_2CH_2CH(CH_3)$— | | $C_6H_5$ | $C_2H_5$ |
| IIIc | $CH_3$ | $CH_3$ | 2-$CH_3$ | $C_6H_5$ | $C_2H_5$ |
| IIId | $CH_2C_6H_5$ | $CH_2C_6H_5$ | H | $C_6H_5$ | $C_2H_5$ |
| IIIe | $C_2H_5$ | $C_2H_5$ | H | $C_6H_5$ | $C_4H_9$ |
| IIIf | $C_2H_5$ | $C_2H_5$ | H | $C_6H_5$ | $CH_2CH{=}CH_2$ |
| IIIg | $C_2H_5$ | $C_2H_5$ | H | $C_6H_5$ | $CH_2CH_2C(O)OCH_3$ |
| IIIh | $C_2H_5$ | $C_2H_5$ | H | $C_6H_5$ | $CH_2C(O)OCH_2CH_3$ |

In a specific embodiment of the invention, the third yellow dye is employed having the following structure (Dye 14 or IIIg):

Dye 14

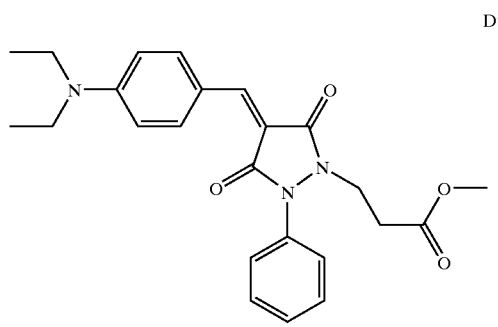

In another embodiment of the invention, a fourth yellow dye is employed having formula IV:

IV

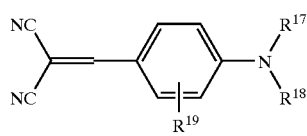

wherein:
- $R^{17}$ is an alkyl or allyl group of from 1 to 10 carbons atoms, such as methyl, ethyl, propyl, isopropyl, butyl, pentyl, or hexyl, a cycloalkyl group of from 5 to 7 carbon atoms, such as cyclopentyl or cyclohexyl, or an aryl group having from 6 to 10 carbons atoms;
- $R^{18}$ is any of the groups as described for $R^{17}$ or substituted with hydroxy, acyloxy, alkoxy, aryl, carboxy, carbalkoxy, cyano, acylamido, halogen, or phenyl, or represents the atoms which when taken together with $R^{19}$ forms a 5- or 6-membered ring, provided that $R^{17}$ and $R^{18}$ are not both acetate at the same time;
- $R^{19}$ is an alkyl group of from 1 to 10 carbons, an alkoxy group of from 1 to 6 carbon atoms, or represents the atoms which when taken together with $R^{18}$ forms a 5- or 6-membered ring.

| Dye | $R_{17}$ | $R_{18}$ | $R_{19}$ |
|---|---|---|---|
| IVa | $C_2H_5$ | $C_2H_5$ | H |
| IVb | $C_2H_5$ | $C_2H_5$ | 2-$CH_3$ |
| IVc | $CH_2C_6H_5$ | $CH_2C_6H_5$ | H |
| IVd | $C_2H_5$ | $CH_2C(O)OC_2H_5$ | H |
| IVe | $C_2H_5$ | $CH_2C_6H_5$ | Cl |
| IVf | $C_2H_5$ | $CH_2C_6H_5$ | H |
| IVg | $CH_2C_6H_5$ | $CH_2C(O)OC_2H_5$ | H |
| IVh | $CH_2C(O)OC_2H_5$ | $CH_2C_6H_5$ | 2-$CH_3$ |
| IVi | $C_2H_5$ | $CH_2C_6H_5$ | 2-$CH_3$ |
| IVj | $C_2H_5$ | $CH_2C(O)OC_2H_5$ | H |

In a more specific embodiment of the invention, the fourth yellow dye is employed having the following structure (Dye 15):

Dye 15

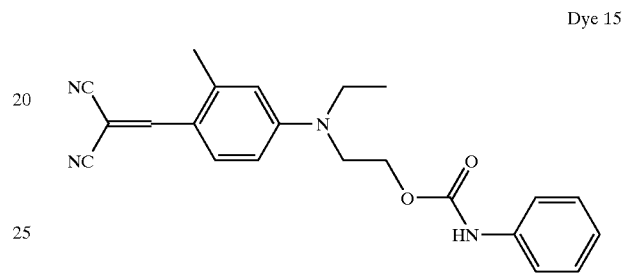

In a thermal dye transfer element of the laser type, the element suitably also contains an IR sensitive dye such as one of formula V:

V

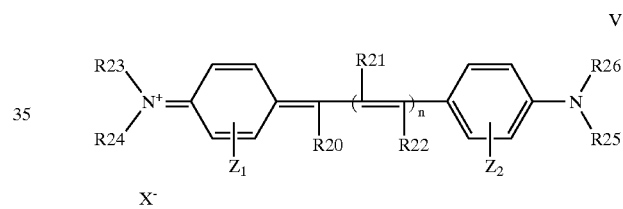

X⁻ wherein:
- $R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;
- $R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;
- or $R_{23}$, $R_{24}$, $R_{25}$, and $R_{26}$ may be joined together to form a 5- to 7-membered heterocyclic ring;
- or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;
- n is 1 to 5;
- X is a monovalent anion;
- $Z_1$ and $Z_2$ each independently represents $R_{20}$ or the atoms necessary to complete a 5- to 7-membered fused carbocyclic or heterocyclic ring.

Unless otherwise specifically stated, use of the term "group", "substituted" or "substituent" means any group or radical other than hydrogen. Additionally, when reference is made in this application to a compound or group that contains a substitutable hydrogen, it is also intended to encompass not only the unsubstituted form, but also its form further substituted with any substituent group or groups as herein mentioned, so long as the substituent does not destroy properties necessary for the intended utility. Suitably, a substituent group may be halogen or may be bonded to the remainder of the molecule by an atom of carbon, silicon, oxygen, nitrogen, phosphorous, or sulfur. The substituent may be, for example, halogen, such as chloro, bromo or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, cyclohexyl, and tetradecyl, alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- and beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecylphenylcarbonylamino, p-tolylcarbonylaamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

EXAMPLES

The following comparative compounds have been used in order to demonstrate the invention. Controls 1, 2, 3, and 4 employed in comparative examples have been described in the specification of U.S. Pat. No. 5,081,101. Controls 5, 6, and 7 have been disclosed in the specification of U.S. Pat. No. 4,833,123.

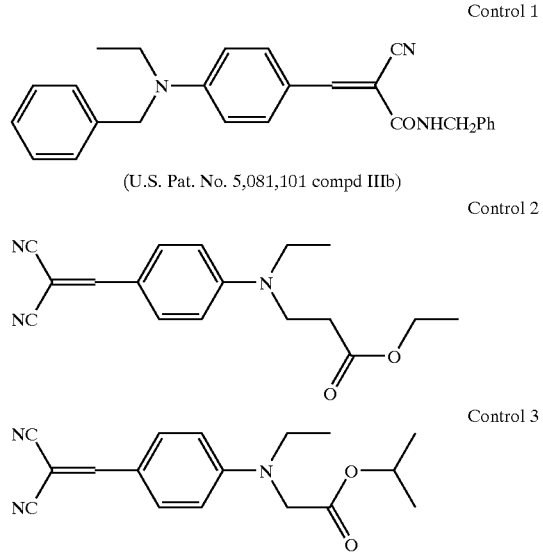

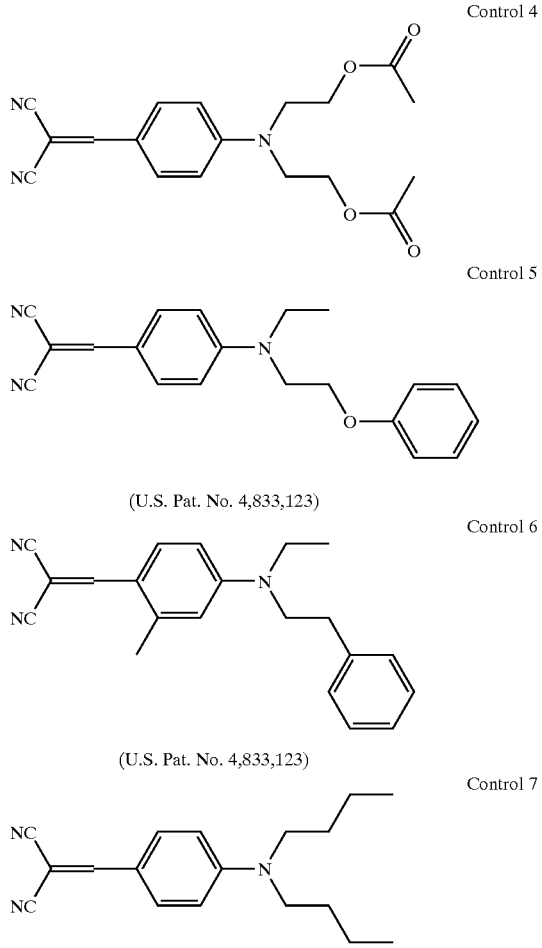

Example 1

In order to compare the light stability of the various yellow dyes, individual yellow dye image elements were prepared by coating on a 100 μm poly(ethylene terephthalate) support a dye layer containing a mixture of an inventive or comparative yellow dye in combination with Dye 13 at 0.010 g/m², Dye 14 at 0.029 g/m², Dye 15 at 0.013 g/m² in a polyvinylbutyral binder (Butvar B-76 from Solutia) at 1.076 g/m². The following Table 1 lists the amounts of inventive or comparative yellow dyes used in the coatings to keep them at similar molar levels.

TABLE 1

| Yellow Dye | g/m² |
|---|---|
| Dye 1 | 0.054 |
| Dye 2 | 0.054 |
| Dye 3 | 0.059 |
| Control-1 | 0.058 |
| Control-2 | 0.048 |
| Control-3 | 0.048 |
| Control-4 | 0.055 |
| Control-7 | 0.045 |

The colored layers were cut into 3 sets of ¼" strips and read at 1 nm intervals from 400 nm to 900 nm with a Perkin Elmer Lambda 12 uv-vis spectrophotometer, using an uncoated 100 μm poly(ethylene terephthalate) support as the reference. One set was maintained for dark keeping for 5 days, a second set was placed inside a D5000 viewbooth for 5 days which was illuminated with a color temperature of 5000 which was measured to have 2.2 Klux of light, and the 3$^{rd}$ set was put inside 5.4 Klux daylight exposure for 48 hours. The light fading results are summarized in Table 2 below:

TABLE 2

| Dye | Dark keep (%) 5 days | Dye Density* loss at D5000(%) 5 days | Dye density loss at 5.4 klux (%) 2 days |
|---|---|---|---|
| Dye-2 | 0.26 | 2.12 | 3.71 |
| Control 1 | 0.38 | 13.60 | 14.99 |

*Density loss between 400 and 450 nm

The data shows a much greater dye loss for the control vs. the inventive dye.

A similar experiment was run with a larger set of inventive and control samples. Once again, one set was maintained for dark keep this time only 48 hours, a second set was placed inside a D5000 view booth for also only 48 hours which was illuminated with a color temperature of 5000 which was measured to have 2.2 Klux of light. The light fading results are summarized in Table 3 below:

TABLE 3

| Dye | Dark keeping (%) Dye Density* loss 2 days | Dye Density* loss at D5000(%) 2 days |
|---|---|---|
| Dye- 1 | 0.17 | 0.40 |
| Dye- 3 | 0.59 | 0.71 |
| Control 1 | 0.33 | 6.93 |
| Control 2 | 0.30 | 1.13 |
| Control 3 | 0.37 | 0.49 |
| Control 4 | 0.26 | 0.93 |
| Control 7 | 0.67 | 1.17 |

*Density loss between 400 and 450 nm

Use of the compounds described in the invention showed much improved light stability as compared to control dye 1 with similar spectroscopic properties. On the other hand, the compounds described in the invention provided the desired spectroscopic properties at around λ=410 nm, and therefore have better color match with the printing ink as compared to controls 2–7 (Their λ max values are summarized in Table 4 below) with similar structures, even though they show similar light stability.

TABLE 4

| Dye | λ max in acetone (nm) |
|---|---|
| Dye- 1 | 411 |
| Dye- 2 | 411 |
| Dye- 3 | 408 |
| Control 1 | 410 |
| Control 2 | 430 |
| Control 3 | 423 |
| Control 4 | 431 |
| Control 5 | 436 |
| Control 6 | 438 |
| Control 7 | 439 |

Example 2

Individual yellow dye-donor elements were prepared by coating on a 100 μm poly(ethylene terephthalate) support a dye layer containing a mixture of a yellow dyes, the infrared-absorbing bis(aminoaryl)polymethine dye (Z shown below) as described in U.S. Pat. No. 4,950,639 (column 2 lines 3–68 and column 3 lines 1–3) at 0.046 g/m² in a polyvinylbutyral binder (Butvar B-72 from Solutia) at 0.38 g/m². The following experimental ratios shown in Table 5 were used in laydowns as listed:

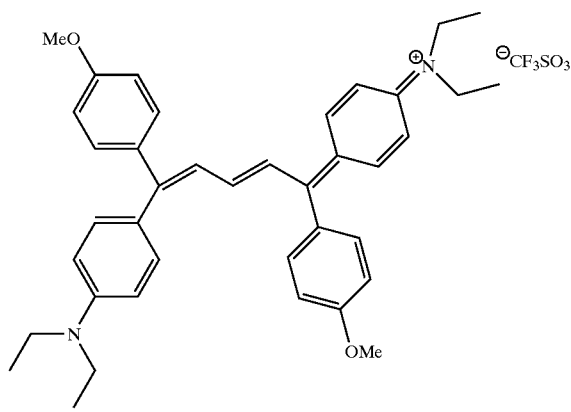

density as described in U.S. Pat. No. 4,876,235. After the exposure, the intermediate receiver was laminated to 60# TextWeb paper (Deferient Paper Company) which had been previously laminated with Kodak Approval® Prelaminate, P02.

All measurements of the yellow images were made using Gretag SPM100 portable spectrophotometer set for $D_{50}$ illuminant and 2° observer angle. Readings were made with black backing behind the samples. The CIELAB L* a* b* coordinates reported are interpolated to a Status T density of 0.98 for comparison with a SWOP certified press sheet (00-15-162), and at a 1.0 Status T density for comparison against the publication ANSI-CGATS TR 001-1995.

The color differences between the samples can be expressed as ΔE, where ΔE is the vector difference in CIELAB color space between the laser thermal generated image and the SWOP aim.

$$\Delta E = \sqrt{((L^*_e - L^*_s)^2 + (a^*_e - a^*_s)^2 + (b^*_e - b^*_s)^2)}$$

Hue angle=360-arctan b*/a* for negative values of b*=arctan b*/a* for positive values of b*

TABLE 5

| Yellow Donor | Featured dye | Featured dye (wt %) | Dye 15 Yellow Dye (wt %) | Dye 14 Yellow Dye (wt %) | Dye 13 Yellow Dye (wt %) | Dry Coverage (g/m²) |
|---|---|---|---|---|---|---|
| Y-1 | Dye-1 | 31.91% | 20.21% | 39.36% | 8.51% | 0.3027 |
| Ctrl-1 | Control 1 | 45.27% | 13.75% | 31.81% | 3.20% | 0.3748 |

An intermediate dye-receiving element, Kodak Approval® Intermediate Color Proofing Film, CAT# 1067560, was used with the above dye-donor elements to print an image. For the monochrome yellow images, the power to the laser array was modulated to produce a continuous tone image of uniform exposure steps of varying wherein subscript e represents the measurements from the experimental materials and subscript s represents the measurements from the SWOP™ aim.

Table 6 summarizes the results obtained.

TABLE 6

| Yellow Dye-Donor | L* | a* | b* | ΔE | Hue Angle | ΔHue Angle | ΔE between Y-1 & Ctrl-1 |
|---|---|---|---|---|---|---|---|
| SWOP Certified Press Sheet 00-15-162 | 84.06 | −5.29 | 82.73 | — | 93.66 | — | — |
| Y-1 | 84.80 | −5.27 | 82.60 | 0.75 | 93.65 | −0.01 | 0.84 |
| Ctrl-1 | 85.07 | −4.83 | 83.20 | 1.23 | 93.32 | 0.34 | |
| ANSI CGATS TR 001 1995 | 84.26 | −5.79 | 84.33 | — | 93.93 | — | — |
| Y-1 | 84.72 | −5.14 | 84.06 | 0.96 | 93.50 | −0.43 | 0.74 |
| Ctrl-1 | 85.01 | −4.74 | 84.62 | 1.32 | 93.21 | −0.72 | |

As can be seen by comparison of the inventive donor and the control in Table 6, the resultant color of the yellow

What is claimed is:

1. A thermal dye transfer yellow donor element containing a combination of dyes useful for forming a light stable yellow image comprising at least two yellow dyes, wherein at least one yellow dye has the formula:

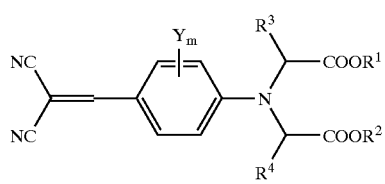

wherein:
- $R^1$ and $R^2$ each independently represents an alkyl group of from 1 to 10 carbons atoms or a cycloalkyl group of from 5 to 7 carbon atoms;
- $R^3$ and $R^4$ each independently represents hydrogen, or an unsubstituted lower alkyl group of 1 to 4 carbon atoms;
- each Y independently represents halogen, or a lower alkyl or alkoxy group of 1 to 4 carbon atoms; and
- m is 0 to 4.

2. The element of claim 1 wherein m is 0.

3. The element of claim 1 wherein $R^3$ and $R^4$ are independently hydrogen or a methyl group.

4. The element of claim 1 wherein Y is chloro or a methyl group and m is 1 or 2.

5. The element of claim 1 wherein $R^1$ and $R^2$ each independently represents an alkyl group of 1 to 4 carbon atoms.

6. The element of claim 1 further comprising a second yellow dye having formula II:

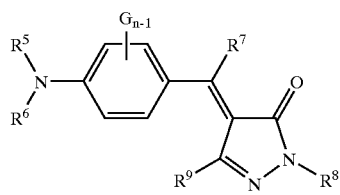

wherein:
- $R^8$ represents an alkyl group of from 1 to 10 carbon atoms, a cycloalkyl group of from 5 to 7 carbon atoms, an allyl group; or an aryl group having from 6 to 10 carbon atoms,
- $R^9$ represents an alkoxy group having from 1 to 10 carbon atoms; an aryloxy group having from 6 to 10 carbon atoms; $NHR^{10}$; $NR^{10}R^{11}$ or the atoms necessary to complete a 6-membered ring fused to the benzene ring;
- $R^5$ and $R^6$ each represents any of the groups for $R^8$; provided $R^5$ and $R^6$ can be joined together to form, along with the nitrogen to which they are attached, a 5- or 6-membered heterocyclic ring or either or both of $R^5$ and $R^6$ can be joined to the carbon atom of the benzene ring at a position ortho to the position of attachment of the anilino nitrogen to form a 5- or 6-membered ring;
- $R^7$ represents hydrogen; an alkyl group of from 1 to 10 carbon atoms, a cycloalkyl group of from about 5 to 7 carbon atoms, an allyl group, halogen, carbamoyl, or alkoxycarbonyl group;
- $R^{10}$ and $R^{11}$ each independently represents any of the groups for $R^8$;
- or $R^{10}$ and $R^{11}$ may be joined together to form, along with the nitrogen to which they are attached, a 5- or 6-membered heterocyclic ring;
- n is a positive integer from 1 to 3; and
- G represents hydrogen, an alkyl or alkoxy group of from 1 to 10 carbon atoms, halogen, or an aryloxy group, or represents the atoms necessary to complete a 5- or 6-membered ring, thus forming a fused ring system.

7. The element of claim 6 wherein $R^5$ and $R^6$ are alkyl groups of 1 to 4 carbon atoms.

8. The element of claim 6 wherein $R^7$ is hydrogen, $R^9$ is $NR^{10}R^{11}$, wherein each $R^{10}$ and $R^{11}$ is a methyl group.

9. The element of claim 6 further comprising a third yellow dye having formula III:

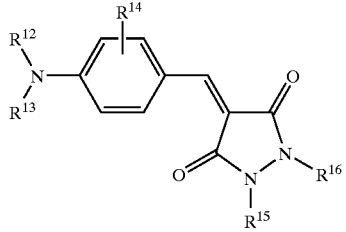

wherein:
- $R^{12}$ is an alkyl or allyl group of from 1 to 6 carbon atoms;
- $R^{13}$ is any of the groups as described for $R^{12}$, or represents the atoms which when taken together with $R^{14}$ forms a 5- or 6-membered ring;
- $R^{14}$ is an alkyl group or an alkoxy group of from 1 to 6 carbon atoms, or represents the atoms which when taken together with $R^{13}$ forms a 5- or 6-membered ring; and
- $R^{15}$ and $R^{16}$ are each independently an alkyl group of from 1 to 6 carbon atoms or an aryl group of from 6 to 10 carbon atoms.

10. The element of claim 9 wherein $R^{12}$ and $R^{13}$ are alkyl of 1 to 4 carbon atoms.

11. The element of claim 9 wherein $R^{14}$ is hydrogen, $R^{15}$ is $CH_2CH_2CO_2CH_3$, and $R^{16}$ is a phenyl group.

12. The element of claim 9 further comprising a forth yellow dye having formula IV:

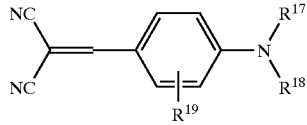

wherein:
- $R^{17}$ is an alkyl or allyl group of from 1 to 10 carbons atoms, a cycloalkyl group of from 5 to 7 carbon atoms, or an aryl group having from 6 to 10 carbons atoms;
- $R^{18}$ is any of the groups as described for $R^{17}$, or represents the atoms which when taken together with $R^{19}$ forms a 5- or 6-membered ring, provided that $R^{17}$ and $R^{18}$ are not both acetate at the same time;
- $R^{19}$ is an alkyl group of from 1 to 10 carbons, an alkoxy group of from 1 to 6 carbon atoms, or represents the atoms which when taken together with $R^{18}$ forms a 5- or 6-membered ring.

13. The element of claim 12 wherein $R^{19}$ methyl.

14. The element of claim 12 wherein $R^{17}$ ethyl, propyl, or butyl and $R^{18}$ is $CH_2CH_2OCONHC_6H_5$.

15. The element of claim 1 further comprising an IR dye.

16. The element of claim 15 wherein the IR dye has formula V

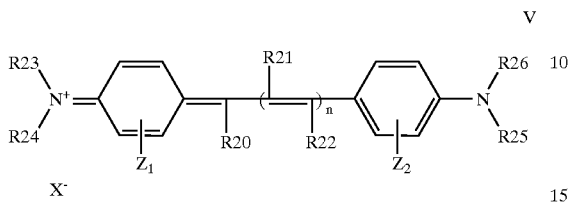

wherein:

$R_{20}$, $R_{21}$, and $R_{22}$ each independently represents hydrogen, halogen, cyano, alkoxy, aryloxy, acyloxy, aryloxycarbonyl, alkoxycarbonyl, sulfonyl, carbamoyl, acyl, acylamido, alkylamino, arylamino, alkyl, aryl, or a heteroaryl group; or any two of said $R_{20}$, $R_{21}$, and $R_{22}$ groups may be joined together or with an adjacent aromatic ring to complete a 5- to 7-membered carbocyclic or heterocyclic ring group;

$R_{23}$, $R_{24}$, $R_{25}$, and $R_{26}$ each independently represents hydrogen, an alkyl or cycloalkyl group having from 1 to 6 carbon atoms or an aryl or heteroaryl group having from about 5 to 10 atoms;

or $R_{23}$, $R_{24}$, $R_{25}$, and $R_{26}$ may be joined together to form a 5- to 7-membered heterocyclic ring;

or $R_{23}$, $R_{24}$, $R_{25}$, and $R_{26}$ may be joined to the carbon atom of the adjacent aromatic ring at a position ortho to the position of attachment of the anilino nitrogen to form, along with the nitrogen to which they are attached, a 5- or 6-membered heterocyclic ring group;

n is 1 to 5;

X is a monovalent anion;

$Z_1$ and $Z_2$ each independently represents $R_{20}$ or the atoms necessary to complete a 5- to 7-membered fused carbocyclic or heterocyclic ring.

17. The element of claim 1 wherein the dye of formula I has one of the following formulas.

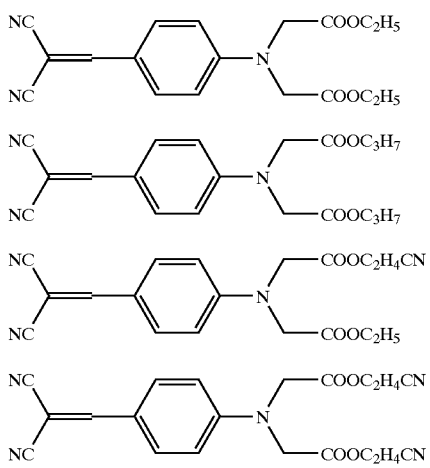

Dye 1

Dye 2

Dye 3

Dye 4

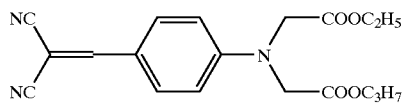

Dye 5

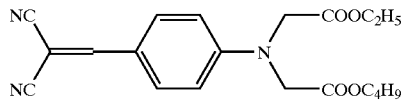

Dye 6

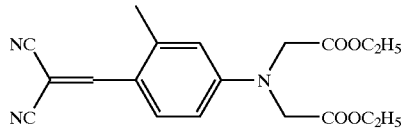

Dye 7

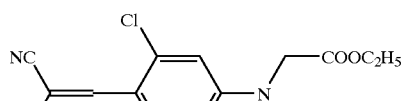

Dye 8

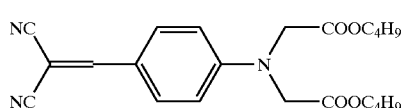

Dye 9

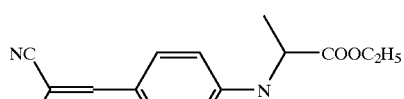

Dye 10

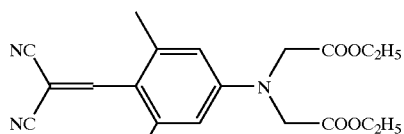

Dye 11

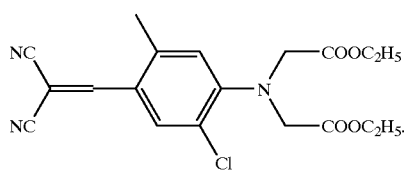

Dye 12

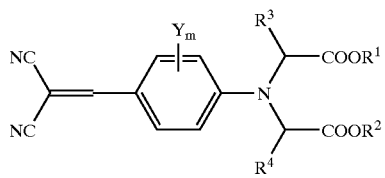

18. A yellow dye combination comprising at least two yellow dyes, wherein at least one yellow dye has formula I:

$$\text{I}$$

wherein:
$R^1$ and $R^2$ each independently represents an alkyl group of from 1 to 10 carbons atoms or a cycloalkyl group of from 5 to 7 carbon atoms;
$R^3$ and $R^4$ each independently represents hydrogen, or an unsubstituted lower alkyl group of 1 to 4 carbon atoms;
each Y independently represents halogen, or a lower alkyl or alkoxy group of 1 to 4 carbon atoms; and
m is 0 to 4.

19. The dye combination of claim 18 wherein m is 0.

20. The dye combination of claim 18 wherein $R^3$ and $R^4$ are hydrogen or a methyl group.

21. The dye combination of claim 18 wherein Y in formula I is chloro or a methyl group and m is 1 or 2.

22. The dye combination of claim 18 wherein $R^1$ and $R^2$ each independently represents an alkyl group of 1 to 4 carbon atoms.

23. The dye combination of claim 18 containing a second yellow dye of formula II:

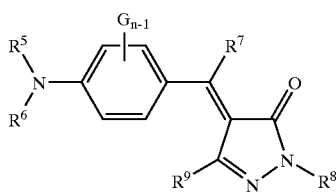

II wherein:
- $R^8$ represents an alkyl group of from 1 to 10 carbon atoms, a cycloalkyl group of from 5 to 7 carbon atoms, an allyl group; or an aryl group having from 6 to 10 carbon atoms,
- $R^9$ represents an alkoxy group having from 1 to 10 carbon atoms; an aryloxy group having from 6 to 10 carbon atoms; $NHR^{10}$; $NR^{10}R^{11}$ or the atoms necessary to complete a 6-membered ring fused to the benzene ring;
- $R^5$ and $R^6$ each represents any of the groups for $R^8$; provided $R^5$ and $R^6$ can be joined together to form, along with the nitrogen to which they are attached, a 5- or 6-membered heterocyclic ring or either or both of $R^5$ and $R^6$ can be joined to the carbon atom of the benzene ring at a position ortho to the position of attachment of the anilino nitrogen to form a 5- or 6-membered ring;
- $R^7$ represents hydrogen; an alkyl group of from 1 to 10 carbon atoms, a cycloalkyl group of from about 5 to 7 carbon atoms, an allyl group, halogen, carbamoyl, or alkoxycarbonyl group;
- $R^{10}$ and $R^{11}$ each independently represents any of the groups for $R^8$;
- or $R^{10}$ and $R^{11}$ may be joined together to form, along with the nitrogen to which they are attached, a 5- or 6-membered heterocyclic ring;
- n is a positive integer from 1 to 3; and
- G represents hydrogen, an alkyl or alkoxy group of from 1 to 10 carbon atoms, halogen, or an aryloxy group, or represents the atoms necessary to complete a 5- or 6-membered ring, thus forming a fused ring system.

24. The dye combination of claim 23 containing a third yellow dye having formula III:

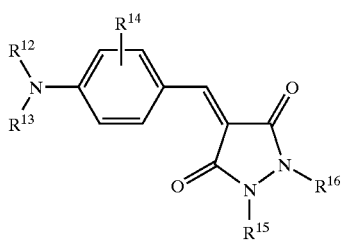

III wherein:
- $R^{12}$ is an alkyl or allyl group of from 1 to 6 carbon atoms;
- $R^{13}$ is any of the groups as described for $R^{12}$, or represents the atoms which when taken together with $R^{14}$ forms a 5- or 6-membered ring;
- $R^{14}$ is an alkyl group or an alkoxy group of from 1 to 6 carbon atoms, or represents the atoms which when taken together with $R^{13}$ forms a 5- or 6-membered ring; and
- $R^{15}$ and $R^{16}$ are each independently an alkyl group of from 1 to 6 carbon atoms or an aryl group of from 6 to 10 carbon atoms.

25. The dye combination of claim 24 further comprising a forth yellow dye having formula IV:

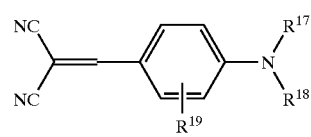

IV wherein:
- $R^{17}$ is an alkyl or allyl group of from 1 to 10 carbons atoms, a cycloalkyl group of from 5 to 7 carbon atoms, or an aryl group having from 6 to 10 carbons atoms;
- $R^{18}$ is any of the groups as described for $R^{17}$, or represents the atoms which when taken together with $R^{19}$ forms a 5- or 6-membered ring, provided that $R^{17}$ and $R^{18}$ are not both acetate at the same time;
- $R^{19}$ is an alkyl group of from 1 to 10 carbons, an alkoxy group of from 1 to 6 carbon atoms, or represents the atoms which when taken together with $R^{18}$ forms a 5- or 6-membered ring.

26. The combination of claim 25 wherein the fourth dye has the structure

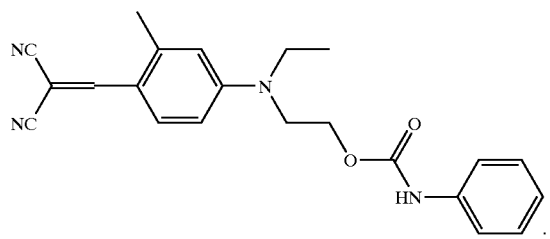

27. The combination of claim 18 wherein the dye of formula I has one of the following formulas.

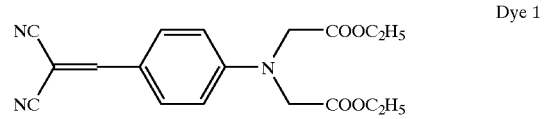

Dye 1

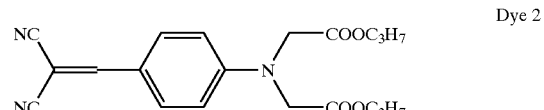

Dye 2

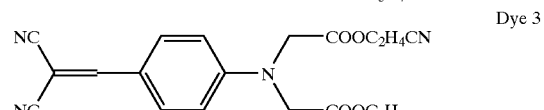

Dye 3

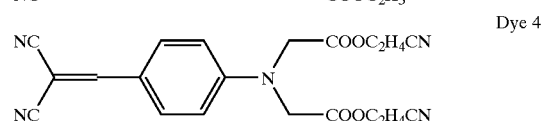

Dye 4

-continued
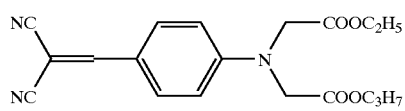
Dye 5
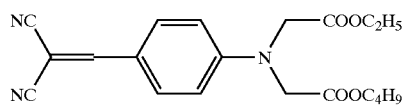
Dye 6
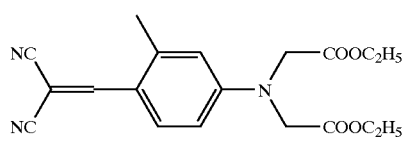
Dye 7
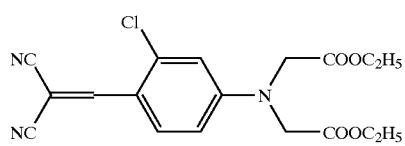
Dye 8
-continued
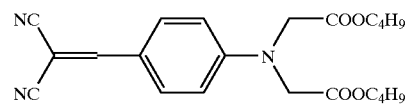
Dye 9
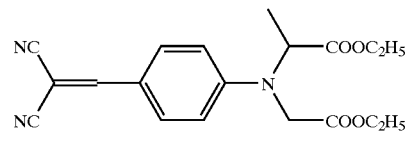
Dye 10
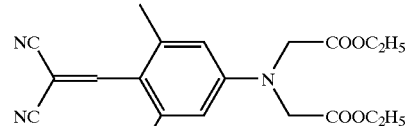
Dye 11
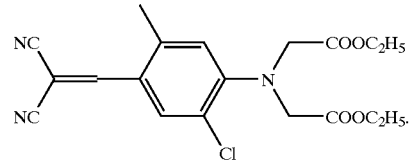
Dye 12
* * * * *

UNITED STATES PATENT AND TRADEMARK OFFICE
CERTIFICATE OF CORRECTION

PATENT NO. : 6,869,909 B2
DATED : March 22, 2005
INVENTOR(S) : Ruizheng Wang et al.

It is certified that error appears in the above-identified patent and that said Letters Patent is hereby corrected as shown below:

<u>Column 17,</u>
Line 1, after "$R^{19}$" and before "methyl" insert -- is --.
Line 2, after "$R^{17}$" and before "ethyl" insert -- is --.

Signed and Sealed this

Sixth Day of September, 2005

JON W. DUDAS
*Director of the United States Patent and Trademark Office*